Nov. 19, 1968  TAKASHI SHIRAI  3,411,465
METHOD FOR INCINERATING MOIST MATERIALS
AND AN APPARATUS THEREFOR
Filed Feb. 23, 1967  3 Sheets-Sheet 1

INVENTOR
TAKASHI SHIRAI
BY
Woodhams, Blanchard & Flynn
ATTORNEYS

United States Patent Office 3,411,465
Patented Nov. 19, 1968

3,411,465
METHOD FOR INCINERATING MOIST MATERIALS AND AN APPARATUS THEREFOR
Takashi Shirai, 10–42 2-chome, Ookayama,
Meguro-ku, Tokyo, Japan
Filed Feb. 23, 1967, Ser. No. 617,980
Claims priority, application Japan, Feb. 23, 1966,
41/10,689
19 Claims. (Cl. 110—8)

ABSTRACT OF THE DISCLOSURE

Incineration of moist waste material is performed in fluidized beds of higher melting inert particles in an approximately cylindrical vessel where a slow stirring is applied to the fluidized bed, and, if desired, dehydration of feed stock is effected in that vessel by passing combusted gas upwardly through a dehydrating bed charged with moist feed material while applying a slow stirring thereto, the gas being flowed upwardly at a sufficiently high rate relative to that of the particles to prevent downflow of water, thereby causing free water to become present at the upper end of the vessel, and withdrawing free water.

---

This application is an improvement on my copending application Ser. No. 453,044, now Patent No. 3,360,866.

BACKGROUND OF THE INVENTION (a) *Field of the invention*

The present invention relates to a method for incinerating combustible moist waste materials.

(b) *Description of the prior art*

With the concentration of population into large cities and the integration and expansion of industrial facilities having been ever increasing in recent years, reasonable and hygienic disposal of various waste materials and liquids have constituted a serious social problem. While various disposition methods have been studied and proposed, it has been accepted as being the best practical method, from the viewpoint of hygiene and for other reasons, to completely incinerate all that is combustible to ashes. In view of the fact, however, that these waste materials in general contain much moisture, there have been encountered quite a few problems in conducting both the drying and combustion of these waste materials. Besides, the disposal of moisture-containing waste materials according to the prior art was accompanied by low thermal efficiency, and therefore, such operation was conducted with limited efficiency. Furthermore, the methods of the prior art required a large area and equipment of a large scale. For these reasons, it is considered still too early to directly put the methods of the prior art into practice.

For example, human waste, the drainage running underground in large cities, or combustible materials suspended therein usually contain 70 percent or more of moisture even after undergoing dehydration and concentration processes, and therefore, it is in general impossible to conduct continuous incineration of these materials without additionally treating them. Thus, the incineration of the prior art had to rely on a complicated procedure in which the waste materials were first subjected to partial dehydration which was conducted on an unefficient air-dry bed which required a large land area, or by various other mechanical drying means. These waste materials which were subjected to incineration, however, tended to adhere and coagulate onto the peripheral walls or other parts of the drying apparatus even during the drying process, and it has been practically difficult to perform a smooth and continuous operation for an extended period of time.

On the other hand, several other methods have been developed to directly incinerate sludges. They include the Zimmerman method (wet incineration method) and the AST method (atomizing-suspension technique). These known methods are, however, defective in that they required complicated operation procedure and high cost for the construction of the equipment.

In recent years, several types of incineration furnaces employing a fluidized bed consisting of inert solid particles such as sand grains having a high melting point have been proposed based on the fact that the fluidized bed has a good thermal conductivity. These incineration furnaces of the fluidized bed type of the prior art are designed so as to combust the waste materials of sludge-form in such manner that the surfaces of the air-fluidized solid particles become covered slightly with the waste materials to be incinerated. While the prior art is relatively simple in the theory and employs apparatuses which are also relatively simple and also the operation does not require complicated procedure, they bear the following shortcomings:

(a) In the event that materials containing a substantial quantity of moisture are fed, the inert individual particles which have grown into separate masses by the adhesion thereto of the moisture-containing sludge, cling to the peripheral walls and the bottom face of the apparatus and accumulate on these portions of the apparatus, gradually merging into a large mass and thus eventually hampering the smooth fluidization in the entire area of the apparatus. It is, therefore, necessary to dehydrate the waste material to a substantial extent in advance by, for example, centrifuging techniques. As such, this type of method of the prior art is not suitable for effecting a continuous treatment of a large quantity of waste materials at low cost.

(b) Even when the incineration is conducted at a temperature much lower than the melting point of the fluidized solid particles, it has been encountered almost invariably with this type of apparatuses of the prior art that the incinerated waste materials coagulate on the surfaces of the solid particles and grow into masses and cover the entire bottom face of the apparatus at the end of several hours or several days at the longest, and that, as has been described in the preceding paragraph, the function of the fluidized bed itself becomes paralyzed. Such coagulation occurs without exception even in case the solid particles consist of sand, alumina or particles of other kind which have been preliminarily deprived, to a maximum extent, of the iron and other impurities contained therein. Such processed solid particles are effective in prolonging, to only a limited length, the period in which continuous operation can be conducted, but the use of these processed solid particles does not solve the problems completely. In the event that ashes having a low melting point are contained in the incinerated materials, however, the operation is limited to a short period of time.

(c) In order to elevate the temperature of the overall apparatus at the starting time, or in order to compensate for the reduction in the temperature during the operation, the methods of the prior art include the step of introducing, from the bottom of the apparatus, a high temperature gas or combustion gas into the apparatus through a gas-distribution device such as a perforated plate located in the apparatus. As the result, the portions of the apparatus in the vicinity of the gas-distributing means is exposed to a considerably high temperature. It is, therefore, necessary to take such factors as the expansion due to heat, fireproofness and strength and durability of these portions, into consideration in the selection of the material for use in the construction of the apparatus and it is also necessary that the construction material be inexpensive. These factors provide a number of problems in constructing an apparatus of a large scale. Furthermore, those solid particles which are located in the vicinity of the gas-distributing means where the temperature is extremely high are all the more susceptible of causing the aforesaid cinders and a massifying phenomenon and accelerate the impairment of the sound, continuous operation of the apparatus.

(d) Furthermore, with the fluidized bed-type incineration apparatus of the prior art, it is completely impossible to soundly incinerate the waste materials, such as garbage, various other refuse, human waste, miscellaneous rubbishes suspended in sewage and animal excretions. Because, these massiform (large and heavy) materials which are to be incinerated are, in general, not suitable by nature for being fluidized and tend to be heaped up on the bottom of the apparatus. They not only cause uneven distribution of the supplied air because they block the passageways of air in the apparatus, but also form combined masses of the waste materials and the solid particles such as sand grains, since the waste materials adhering to the solid particles coagulate on the surfaces of the sand grains due to heat and gradually grow into larger masses as the incineration progresses. These masses further increase their volume and accumulate on the bottom of the apparatus while securely adhering thereto and they do not become fluidized. Eventually, they cover the entire surface of the bottom area and completely arrest fluidization, resulting in the suspension of the operation of the apparatus. Besides, these masses of particles are securely adhered to the walls and the bottom of the apparatus and therefore, it requires a great deal of trouble and effort to remove them therefrom.

SUMMARY OF THE INVENTION

The present invention contemplates elimination of such shortcomings and defects of the prior art as those discussed in the preceding paragraphs (a) through (d) which have been encountered in the incineration of waste materials in incinerating furnaces of fluidized bed type, by conducting the incineration while arresting the formation of masses of waste materials and solid particles in the apparatus by holding the temperature of the air passing through the gas-distribution plate at normal temperature or at a temperaure as low as that of slightly preheated air, and by subjecting them to gentle mechanical stirring within the apparatus, thereby dispersing both the waste materials and solid particles so they do not cling together when combusted. It is an object of the present invention to provide a method for continuously and successively conducting incineration of moist waste materials for an extended period of time by introducing combustible waste materials such as sludges, garbage, muddy materials, various refuses, rubbishes and human waste containing a considerable quantity of moisture either continuously or intermittently into the beds of solid particles such as ordinary sand grains or cinders of the waste materials which are fluidized under a pressure which, in general, is in the vicinity of atmospheric pressure while maintaining said solid particles at a temperature necessary for causing the combustion of the waste material introducde thereto and conducting gentle mechanical stirring in said fluidized bed, and also to provide an apparatus suitable for executing the aforesaid operation.

Another object of the present invention is to provide a method for conducting, in a single apparatus, both the dehydration and incineration of the combustible waste materials containing a large quantity of moisture which have been considered impossible with the use of the fluidized bed-type incineration furnaces of the prior art, by the application of a process utilizing the so-called flooding phenomenon, and to provide an apparatus therefor.

As is well known, the heat transfer coefficient in a fluidized bed is greater by over ten times to several tens of times than that of an empty vessel containing no solid particles therein, provided that the other conditions are identical. Accordingly, the velocity of the mass transfer is by far the greater with the fluidized bed than with the empty vessel. Therefore, by immersing water-containing foodstuffs such as fish, vegetables, meat and fruits in a fluidized bed of solid particles such as culinary salt which is innocuous from the viewpoint of food sanitation, it is possible to dry them up within a period of time much shorter than is possible with the conventional drying method. Let us now assume that, for example, a fresh fish which usually contains about 80 percent of moisture is introduced, in the original shape of the fish, into the fluidized salt bed which is maintained at a temperature slightly higher than the normal temperature, the body of the fish is first dried up, then the surfaces of the fish is scorched black, and eventually the whole body becomes charred and combusted. This holds true with rubbishes and other combustible materials. The conception of the present invention was motivated by this fact.

In the method for incinerating moist combustible waste materials in a fluidized bed and the apparatus therefor of the present invention wherein solid particles such as sand grains are fluidized, apart from the fluidized salt grains used in the drying of foodstuffs, and wherein said particles are further gently stirred, the role of the grains such as sand and the role of the stirrer are described as follows:

(A) With the solid particles being used to constitute a fluidized bed, they serve to maintain the entire bed at a uniform combustion temperature, and furthermore they accelerate the rate of heat transfer, drying and combustion.

(B) They serve to increase the thermal capacity within the apparatus, and therefore, in the event that a large quantity of combustible waste material of a low temperature containing a lot of moisture is introduced into the apparatus at a time, the solid particles serve to prevent an uneven drop of temperature throughout the entire area and also prevent the temperature from dropping under the combustion temperature. In the meantime, the moist-containing waste material is dried and combusted, and the temperature within the apparatus resumes the initial level.

(C) Solid particles of a high temperature adhere to the wet surfaces of the introduced waste materials and quickly absorb the moisture therefrom and cause the moisture to evaporate. In case the introduced material is, for example, a quantity of sludge consisting of flour containing 85 percent of moisture, each lot of the dispersed sludge is instantaneously adherently surrounded by the solid particles which dehydrate the individual lots of moist flour and then destroy them and burn them up. During the process of drying and combustion, the mass of the solid particles and the material to be burned are quite easily destroyed also by the aforesaid gentle stirring which is effected with the use of minimum driving power, so that the combustible components are combusted completely while the individual solid grains are again separated from each other and resume their role of fluidizing in the interior of the apparatus.

(D) Even in case the residual ashes after incineration tend to be fused or to coagulate, the solid particles absorb the ashes to some extent, thus preventing the melted ashes from coagulating to each other and from adhering to the walls of the apparatus.

(E) As is so with the ordinary incinerating apparatus of the fluidized bed type, the waste material supplied in atomized form into the apparatus is contacted by the solid particles which are fluidized therein at a very high temperature and are dried up almost instantaneously, and the dried material adheres to the surfaces of the solid particles. Then they are heated to a high temperature and are combusted finally. Even in such instance, it never occurs that the masses of particles settle on the walls and bottom and grow into greater masses to eventually hamper the fluidization within the vessel.

(F) In the event that rubbishes of vegetables, fish or animal entrails and guts, excretions, garbages or other massiform waste are to be incinerated, they are usually lighter than the bulk density of the fluidized bed of solid particles (in case of sand grains, the bulk density is usually in the range of from 1.2 to 1.3 gr./cc.) and therefore, these wastes which contain a large quantity of water will, immediately after being introduced into the fluidized bed, sink below the surface of the fluidized bed. However, they are instantaneously dried up and lose their weight and rise up to the surface. Thus, they are combusted in the portion of the bed above the middle level. Even when some lumps of material sink to the bottom, they will be driven upwardly and gradually disintegrated by the action of the stirring and thus they will not hamper fluidization so that incineration operation can be continued.

In the present invention, satisfactory results are obtained by a very gentle mechanical stirring of the fluidized bed of solid particles. The aforedescribed mechanical stirring can be effectively achieved at a slow rotation speed of 30 r.p.m. or lower. The velocity of stirring can vary with the type of the materials to be incinerated, the nature of the inert solid particles used, the size of the apparatus, the rate of combustion and various other conditions. The velocity of stirring can be as low as 1 r.p.m. in some instances. It is also to be noted that the stirring does not have to be conducted uniformly within the vessel. In many cases, the desired objects can be attained by conducting the stirring only in the area immediately above the gas-distribution plate. The stirrer used for this purpose generally is of the structure comprising a rotary shaft having one to several elongated strip-like vanes fixed around the shaft in one plane or in vertically arranged multiple planes. It is needless to say that the vanes may have any desired shape and the arrangement of the vanes may be made in an appropriate manner. From the viewpoint of designing of the apparatus, the rotary shaft preferably consists of a straight shaft extending upright into the fluidized bed of the vessel from the bottom thereof. Preferably, the stirrer is designed so that the rotating vanes will create substantially upward flow of particles. In the event that it is desired to combust a fuel in the fluidized bed by the use of an auxiliary burner, the local overheat which takes place in the vicinity of the nozzle of the burner will sinter the fed or fluidized materials, leading to an intensive heap of coagulated materials, and will paralyze the continuous operation. It is necessary, therefore, to effectively conduct the stirring to avoid it. To this end, it is advantageous to use L-shaped vanes so that the effect of stirring will extend to the vicinity of the nozzle of the burner.

Even a very gentle stirring as has been described or even local stirring will provide such a marked effect as has never been expected. It is to be noted that with the conventional apparatuses where stirring is not employed, there occurred masses of sintered materials accumulated on the air-distributing plate and disabled the fluidization within a short period of time. However, the application of stirring according to the present invention completely eliminates such inconveniences.

The solid particles used in the present invention may be comprised of those solid particles which are used in the conventional ordinary fluidized beds, provided that they have a melting point higher than the combustion temperature of the combustible materials to be incinerated. The solid particles which are applicable to the present invention include sand grains, refuse metals, slags, powder-form iron ores, or the like. It should be understood, however, that the present invention is not restricted thereto. Also, the present invention is not restricted to the employment of any particular diameter of solid particles. For example, usual diameter of the solid particles is in the range of from $50\mu$ to 60 mm. However, those solid particles having a diameter departing from the foregoing range can be also applicable to the present invention, provided that they satisfy the requirements of being usable in the fluidized bed.

The supply rate of the combustion gas into the fluidized bed in the present invention varies with the nature of the waste materials to be incinerated, the nature of the fluidized solid particles, the velocity of combustion, and other conditions. In the view of this gas supply rate influences the draining of water by flooding which will be described later. The inventor has conducted an extensive study and experiments with particular importance placed on this rate of gas supply. As a result, the inventor has confirmed that it is necessary to pass a gas at the velocity in the range of from three to fifteen times as great as the minimum fluidization velocity ($U_{mf}$) of fluidized solid particles. It is added that the rate of gas supply which does not substantially depart from this range permits stable continuous operation with the aid of the aforesaid stirring. The gas to be introduced is, most preferably, air. However, for the purpose of interregulation between combustion, fluidization and flooding, oxygen-enriched air or air-containing diluted exhaust gas may be used.

It is also an important feature of the invention to provide a continuous operation system comprising, in combination, a dehydration step which utilizes flooding phenomenon (which will be described later) in a packed column which is one of the countercurrent gas-liquid contact apparatuses, and a stirring fluidized bed-type incineration step which bears the advantages as described, to thereby efficiently conduct the multiple operations from dehydration to incineration in one apparatus.

In packed columns which are often used as gas-liquid contact apparatuses, there occurs a phenomenon that when the flow rate of the gas directed upwardly exceeds a certain level, the downward flow of liquid is arrested and as a result it becomes practically impossible for the liquid to proceed downward. In ordinary packed columns, operation will become impossible unless it is conducted under conditions below this flooding point. In actual operations, therefore, this phenomenon of flooding is regarded as being dangerous for the operation. In the present invention, however, this otherwise dangerous flooding is purposely utilized so as to reduce the downflow of the water from the bed of solid particles to almost nil or, on the contrary, to push the water upwardly to thereby effect dehydration and separation of the water from the materials to be incinerated. By doing so, the subsequent incineration will be remarkably facilitated. This means that a continuous operation in a single apparatus designed for the combined operations of dehydration, drying and incineration is made possible. For example, in a packed bed, of solid particles where the packed solid particles consist of ordinary sand grains having a mean diameter of the order of 0.3 mm. and the gas consists of air of normal temperature, with the minimum fluidization velocity ($U_{mf}$) being in the order of 10 cm./s. (calculated in terms of empty column), the rate of the water of 20° C. flowing downward through the spaces between the particles is substantially irrelevant to the height and the cross-sectional area of the bed of the particles. When no air is passed, the rate is in the order of 1.8 m.$^3$/m.$^2$-hr. In the event that air is passed upwardly into the bed of sand grains at a speed close to $U_{mf}$, the downflow rate of the water will be reduced to only a few percent of the aforesaid value. In case the air is passed at a rate twice as much as $U_{mf}$, then the downflow rate will be reduced to a value as small as one to several hundreds or one to several thousands. The moisture adhering to the surfaces of sand grains and the downflow water of a minute quantity as has been described are readily evaporated by the high temperature combusted gas supplied from below. According to the method of the present invention, therefore, the bed of a mixture of sand grains and combustible waste containing a considerable amount of water can be easily dehydrated, dried and incinerated.

As has been described briefly, the present invention combines various features to conduct the flooding-dehydration, drying and incineration of moisture-containing particles of sludge-like waste materials in one apparatus. Now the description will be directed to a more concrete elucidation of the process and features of the present invention. Specifically, where waste materials in wet state containing a considerable amount of water are fed from above into the bed of solid particles (in some instances, circulated solid particles are included) where stirring and air supply are conducted, in a continuous countercurrent operation with the stirring and the air-supply rate being performed within the permissible range, the following things should be noted:

(a) In the upper portion of the bed of solid particles, the liquid-form water will hardly flow downwardly as is so with the flooding which occurs in a packed column, but in our invention, the water is rather pushed upward.

(b) The waste materials which have been dehydrated by flooding descend in the apparatus due to their own weight and to stirring. During such movement of the materials, they are preheated by the high temperature combusted gas supplied from the lower part of the apparatus.

(c) The preheated particles of waste materials are then exposed, either directly or indirectly, to a higher heat from the high temperature combusted gas in the drying zone and they are held at about 100° C. or at a temperature much higher than that. Here, evaporation of moisture and drying are effected. Since the moisture content of the particles of waste materials is substantially reduced by the dehydration and preheating before they descend into the drying zone, the materials are relatively easily dried in this zone.

(d) The moisture evaporated in the drying zone is carried upwardly by the current of the combusted gas. The latent heat of the evaporated moisture is mostly consumed in the preheating of the wet particles of waste materials. Accordingly, the evaporated moisture will be again condensed into liquid. Thus, a considerably large amount of water is present in the upper area of the apparatus. In some instances, fine particles of waste materials may be suspended in the water located in this section of the apparatus.

(e) The water which is present in such a large amount in the upper portion of the apparatus is drained outside the system continuously therefrom by mechanically separating the water by vacuum filtering or by any other appropriate means. Since the water located in the upper section of the apparatus is of a temperature somewhat higher than the normal temperature due to its taking heat from the combusted gas and from the vapor, the water has a reduced viscosity and, therefore, separation of water becomes easier than it is at normal temperature.

(f) In the event that fine powder of waste materials produced during the drying or combustion process in the apparatus is drifted upwardly by the gas current, the fine particles are completely captured during their passage through the bed of wet particles. The fine particles adhering to the surfaces of wet solid particles descends again. Thus, there is noted no fine powder of waste materials escaping from the top of the apparatus. Accordingly, the provision of dust-removing means is altogether unnecessary.

(g) Both the sensible and latent heat of the vapor and gas is taken away as they pass through the bed of wet particles and the layer of suspension liquid located in the upper section of the apparatus. Under ordinary operating conditions, the calorie which is carried outside the system with the exhaust gas of normal to several ten degrees centigrade, is negligible. Thus, a very high thermal efficiency is obtained.

(h) Those particles of waste materials descending continuously in the apparatus are combusted in the combustion zone located in the lower section of the apparatus. The high temperature combusted gas is directly supplied to the drying zone and to the dehydration zone. Therefore, there is usually not the slightest need of supplying an auxiliary fuel such as crude oil or combustible gas except for the igniting purpose at the time the operation is started. Rather, there may be a need for installing a boiler or the like inside the apparatus to thereby remove a part of the combustion heat. Or, alternately, a part of the particles of waste materials, while they are still wet, may be injected directly into the combustion zone to evaporate the moisture to thereby remove a part of the combustion heat from said zone and to accordingly increase the quantity of the disposed wet particles. Even where combustion is conducted in the lower section of the apparatus, there is no need of providing a tall chimney as has been necessary with the apparatuses of the prior art, and such a very high thermal efficiency as has been discussed above can be obtained.

The flooding-dehydration process combined with said incineration process is most effectively conducted concurrently with appropriate mechanical stirring and gas supply. Mechanical stirring is applied to the dehydration zone and the drying zone. In the dehydration zone this mechanical stirring is conducted so as to maintain the outlet of the separated water clean. In applying the stirring to the drying zone, care is taken so that a relatively dense package of particles is maintained and that the waste materials are fed in such a quantity as to the quantity of the conducted materials. The stirring is conducted at a low speed of 15 r.p.m. or less. Also, vanes are fixed to the periphery of a rotary shaft inserted in the apparatus from the top thereof in a plurality of planes or steps. In the dehydration zone, the vanes consist of screen scraper-type vanes. In the drying zone, the vanes located in the upper part are of such shape as will push the materials downwardly, while the lowermost vanes are of the type that will restrict the quantity transferred downwardly. This arrangement should be varied depending upon the waste materials introduced. It is needless to say that the stirrer located in this zone can be installed so as to concurrently serve to stir the fluidized bed. The gas passed into the bed of particles is, of course, the high temperature combusted gas produced by the combustion of the treated materials. Usually, all of this gas is passed into the bed of solid particles. If necessary, however, the gas is partly exhausted outside the system through a bypass pipe and without leading into the bed of particles. This bypassed gas can be utilized to effect the circulation of the inert solid particles. The rate of gas to be passed to maintain stable flooding is regulated in association with the aforesaid stirring. From the viewpoint of smooth operation in the entire system of the present invention, it is preferred to adjust the rate of gas passing through the drying zone so that it is in the range of one half to five times the $U_{mf}$ of the solid particles to be incinerated. In the present invention, however, it is only necessary that the rate of gas supply be set within the range in which the flooding can take place, and therefore, the rate of supply applicable to the present invention is not restricted to the aforesaid range.

The flooding-dehydration incineration apparatus of the present invention generally is of an approximately cylindrical structure comprising a stirred and aerated bed or a flooding dehydration section (comprising a dehydration section and a drying section) provided above a stirred fluidized bed or a combustion section which is located in the lowest portion of the apparatus. The upper flooding-dehydration section is provided with a free-water draining means. There may be provided an inner cylinder having a narrow cross-sectional area in the drying section. The side walls of the inner cylinder or in the annular portion between the inner and outer cylinder may be provided with small holes to regulate the rate of gas supply. It should be understood, however, that the drying section may be arranged without providing any particular means thereat.

With respect to the structure of the apparatus, description will be made in detail by referring to the drawings.

BRIEF DESCRIPTION OF THE DRAWINGS

Description will be made on the method and the apparatus of the present invention by referring to the accompanying drawings, in which:

In FIGURE 1 is shown an example wherein the apparatus of the present invention is applied to the incineration of fowl excretions. The apparatus comprises an upright cylinder. Air for combustion is supplied, at a temperature in the vicinity of normal temperature or after being preheated, from the bottom portion of the apparatus through an inlet 101 and through a perforated plate 102 to the fluidized bed 103 in which solid particles such as sand grains are fluidized. Reference numeral 104 represents the peripheral wall of the incineration furnace. Reference numeral 105 represents an ignition burner or fluid inlet which is used to heat the interior of the apparatus to the combustion temperature. The fowl excretions which are to be incinerated are fed through a supply inlet 106 into the apparatus. While the excretions descend through the fluidized bed, they are contacted by the high temperature combusted gas and by the sand grains and thus they are heated and dried, eventually combusted to ashes. The fluidized bed is held at a high combustion temperature by virtue of the combustion temperature which is produced during the foregoing process. In the event that there is want of calorie, a combustion gas may be directly introduced into the bed through a gas inlet 105 and by means of a burner or other appropriate means. Numeral 107 represents a combusted gas exhaust pipe. Numeral 108 represents an after-burner for depriving the combusted gas of its odor. Numeral 109 represents a supply inlet of sand grains to the fluidized bed.

Figure 1:
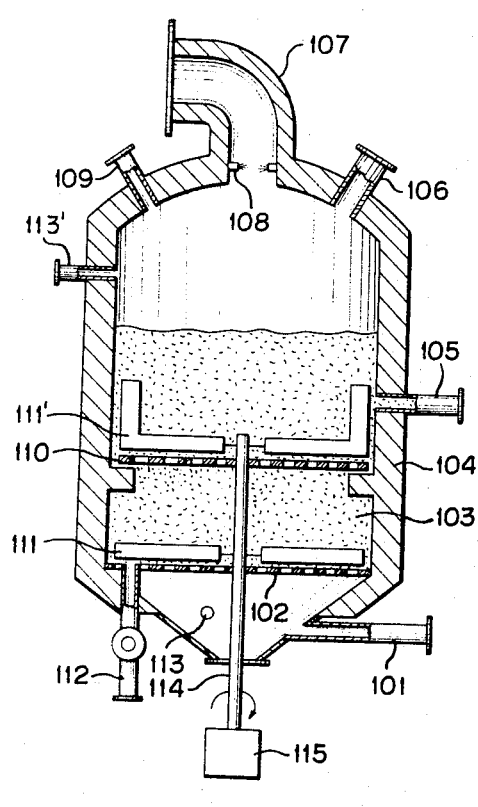
FIGURE 1, FIGURE 2, FIGURE 3 and FIGURE 4 are schematic cross-sectional views showing embodiments of the apparatus suitable for carrying out the method of the present invention.

It is preferred that the fowl excretions which constitute the material to be incinerated are continuously fed into the apparatus in their dispersed state. Since it may occur, however, that the excretions are fed into the apparatus in a mass of considerable size dropping directly on the perforated plate 102 where they may accumulate to block the openings of the plate, there is provided obstructing means 110 in the form of a coarse grate while gentle stirring is performed in the area immediately above this obstructing means 110 by stirring vanes 111' to thereby disperse the masses and to avoid the occurrence of the aforesaid blocking of the openings of the perforated plate. The masses of excretions which have passed through the spaces in the grate 110 downwardly and which have not dispersed into smaller clods are dried, destroyed and dispersed in the highly heated fluidized bed and are eventually combuste to ashes. The area immediately above the perforated plate 102 is also gently stirred to avoid adherence of the particles to the plate by the stirring vanes 111 which are similar to those described above, and these vanes 111 are mounted to the periphery of the common rotary shaft 114. Depending on the type of the material to be incinerated, the combination of the grate 110 and the stirring vanes 111' or the meshes of the grate may be appropriately modified. Furthermore, the combination of the grate and the stirring vanes may be provided in plural sets, one set being located above the other. In some instances, one or both of them may be omitted as required. The grate 110, the perforated plate 102, and the stirring vanes 111 and 111' are constantly polished by being contacted by the fluidized particles. Therefore, there will occur no blocking of the meshes of the grate after the particles of waste materials have dropped downwardly therethrough.

Such materials as fowl excretions which are to be incinerated often contain small shells and small pebbles which would heap up on the perforated plate 102. These obstacles are removed together with a part of sand grains through a discharge outlet 112. This removal of pebbles or the like may be performed jointly through a withdrawing outlet (not shown) provided at an appropriate portion of the apparatus such as the region where the grate 110 is located. The sand grains which have been taken out from the apparatus are screened to remove the foreign elements, and thereafter the segregated sand grains may be mixed with fresh sand grains and supplied to the fluidized bed 103 through the supply inlet 109 of sand grains. Numeral 115 represents a low speed motor which is used to rotate the stirrer shaft 114 at low speed. The vanes 111 and 111' which are fixed to the periphery of this shaft are preferably so angled as to work to take up particles and send them upwardly since such shape of the vanes will serve to effect smooth operation of the apparatus continuously for an extended period and to thereby save the power. Numerals 113 and 113' represent holes for measuring the pressure. Besides these, a plurality of thermocouples for the measuring of temperature are inserted in the wall of the apparatus at appropriate sites thereof. Those fine powder and ashes which scatter outside the system from the outlet 107 are collected by a powder separator such as cyclone. For the sake of recovery of heat boiler or other appropriate means may be provided.

Figure 2:
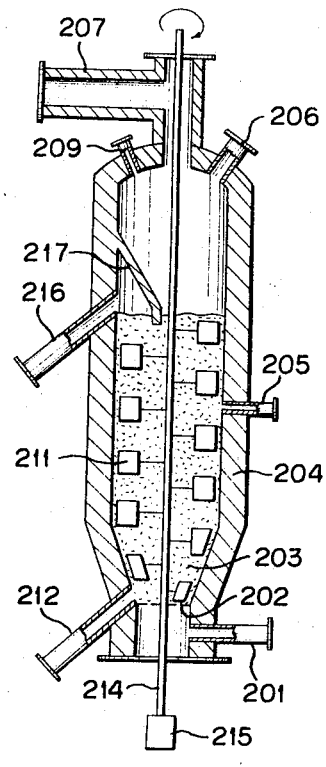

FIGURE 2 illustrates an example of the apparatus of the present invention which is applied to the treatment of condensed sludge from the liquid-form waste discharged from a pulp factory. The reference numerals appearing on this figure whose last two digits are the same as the last two digits of the reference numerals appearing in FIGURE 1 identify corresponding parts. Such sludge contains small pieces of wood, barks, wood meal and fibrous materials or organic substances such as dissolved lignin or inorganic materials. Inorganic materials are represented by sodium sulfite and sodium carbonate. This example shows how such inorganic materials are collected as solid particles. This is effected by feeding condensed sludge into an upright cylindrical apparatus in which solid particles of inorganic particles of appropriate size are fluidized and which has a conically shaped bottom structure, whereby perfect combustion of all that is combustible takes place.

In case the material to be treated is in the form of suspension in a liquid, it may be supplied in atomized state into the apparatus through a supply inlet located at the top 206 thereof, or it may be injected directly into the fluidized bed at the inlet 205 through the peripheral wall 204. Coarse particles are drained from the draining outlet 212 located at the bottom of the apparatus, while relatively fine particles are drained from a draining outlet 216 provided near the surface of the fluidized bed. In addition to these outlets, there may be provided a particle-draining outlet at an arbitrary level of the fluidized bed. A part of the sludge introduced into the apparatus is immediately dried and combusted and reduced to fine particles of inorganic substances alone, which will either stay in said bed by being involved in the fluidized bed or will be discharged together with the combusted gas outside the system from the outlet 207 and will be collected by cyclone or like means so as to be returned to the bed again. These fine particles of inorganic substances will act as cores and collect the sludge onto their surfaces where the deposited sludge is dried and combusted. Thus, the particles of inorganic substances will gradually grow into larger particles and they are discharged locally outside the system from the particle-draining outlets 212 and 216. By arranging so that a small air current flows near the outlets against the direction in which the particles are discharged, this air current will serve to cool and at the same time to classify the particles, so that particles of inorganic substances having relatively uniform size will be collected easily. Numeral 217 is a partition wall to prevent by-passing of particles around the bed.

At a temperature lower than the melting point of particles, sintering and fusing of particles are completely avoided by the stirring of the fluidized bed. Therefore, by employing as high a temperature as possible and by thus holding the bed in the state of reducing atmosphere, it is possible to collect the inorganic substances in the form of reclaimed chemical particles for being used again. In some cases, however, consideration and care may have to be given to hold the structural materials of the apparatus below the permissible temperature by passing water or the like to cool the stirrer shaft and the inside portions of the vanes.

Fluidized beds are usually of an average density of 1.0 gr./cc. or more, so that even when wood pieces or the like are introduced into the apparatus they are dried and combusted while they are floating on the surface of the bed. Thus, wood pieces or like materials will never sink deep into the bed. If small pebbles or nails which have a larger specific gravity are mingled into the apparatus, they will be taken up by the current produced by the vanes rotating a low speed immediately above the perforated plate 202 located in the bottom portion, and thus they are transferred to the outlet 212 wherefrom they are discharged together with coarse particles.

Figure 3:
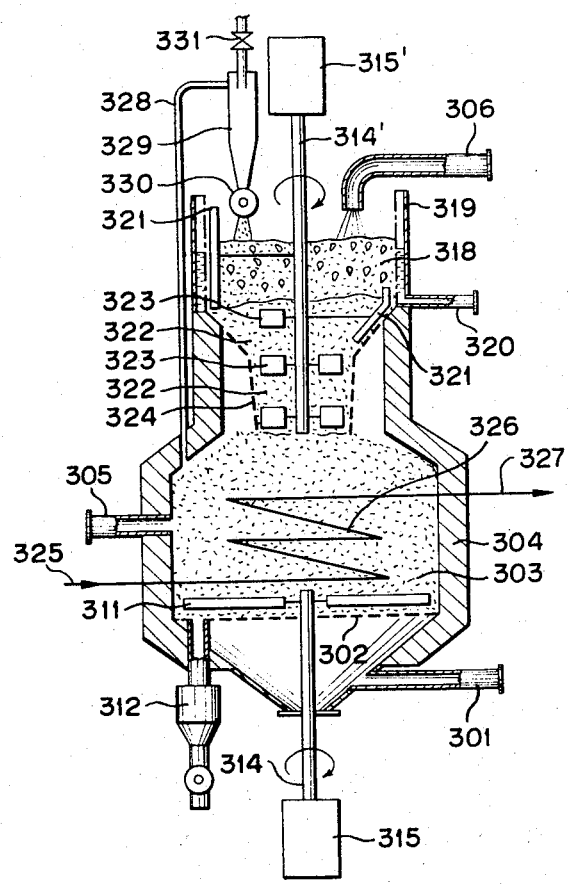

FIGURE 3 shows an example of the apparatus which is used as a smokeless combustion incineration apparatus for combusting fine particles of coal by treating the waste water from coal dressing. The reference numerals appearing in this figure whose last two digits are the same as the last two digits of the reference numerals in FIGURE 1 identify corresponding parts.

This apparatus is provided in the form of a boiler. Fine particles of coal are continuously combusted in the apparatus wherein sand grains or particles of slag or coal, dust coal, soot and ashes are fluidized at substantially atmospheric pressure, and thus generating steam by utilizing the produced heat. At the same time, excessive water is separated at the top portion of the apparatus by utilizing the flooding phenomenon which takes place in the bed of particles, whereby this boiler provides higher thermal efficiency than do boilers of conventional type. This boiler does not require any chimney.

In FIGURE 3, the waste water from coal dressing which is supplied to the apparatus through an inlet 306 located at the top of the apparatus is, in the upper portion indicated at 318, in the state of a bed of bubbles in which solid particles (sand grains and dust coal), waste water and the bubbles of the combusted gas are mingled. The water which is separated by the screen 319 of the peripheral wall which is in contact with this bed is either returned to the water for dressing coal from the water draining outlet 320, or discharged outside the system.

The screen face 319 is periodically scraped substantially clean by the vane 321 which is intended for taking up particles and which is brought into contact with the screen face while rotating at low speed. This cleaning action is also applied to the layer of particles having a substantial thickness which is formed on the screen face 319. Thus, the water is drained from the screen with increased efficiency.

The bed of solid particles such as sand grains and dust coal after being separated of the water to some extent in the bed of bubbles 318 is under the downward pressing force exerted by the stirring vanes 323 mounted to the rotary shaft 314 which is inserted from the top of the apparatus, and the particles are forced to descend through the drying section 322, during which course they are brought directly into contact with the high temperature combusted gas supplied from below. After they are thus dried and preheated there, they drop into the combustion zone 303, where the particles of coal are combusted. By providing a frustoconical shaped inner cylinder 324 provided peripherally with appropriate perforations so that the inner cylinder is heated at its sides by the combustion gas, the drying efficiency and the stability of operation are improved.

Reference numeral 325 represents an inlet for the boiler water supplied. Numeral 326 represents a heating coil. Numeral 327 represents an outlet for the generated steam. Also, a part of the particles located in the combustion zone 303 wherein the particles are fluidized at high temperature may be withdrawn outside the system together with a part of the combusted gas from a conduit 328 so that the particles are there separated from the combusted gas and returned to the top of the apparatus by means of a rotary valve 330 or like means to thereby effect circulation of the particles. Numeral 331 represents an adjusting valve for the gas.

A majority of the combusted gas is brought into contact with wet particles in the drying section 322. As the gas travels through the apparatus in the form of bubbles, the gas is cooled. During this course of the travel of gas, smoke, soot and ashes are absorbed and captured from the gas. Accordingly, the exhaust gas which is discharged from the top of the apparatus is colorless and odorless, and it is of a low temperature. Thus, there is practically no need of providing a chimney except for some special instances.

This system can be used also in the treatment of the water used for transporting coal or in the treatment of the waste water from pulp factory which contains wood meal or like substances. This system is useful also in incinerating a part of organic components of such waste liquid as is difficult to dehydrate it or separate the water therefrom. This is performed as a preliminary treatment of such difficult waste liquid. In doing so, sand grains are replaced by porous adsorptive particles having a high melting point and a part of them is circulated.

Figure 4:
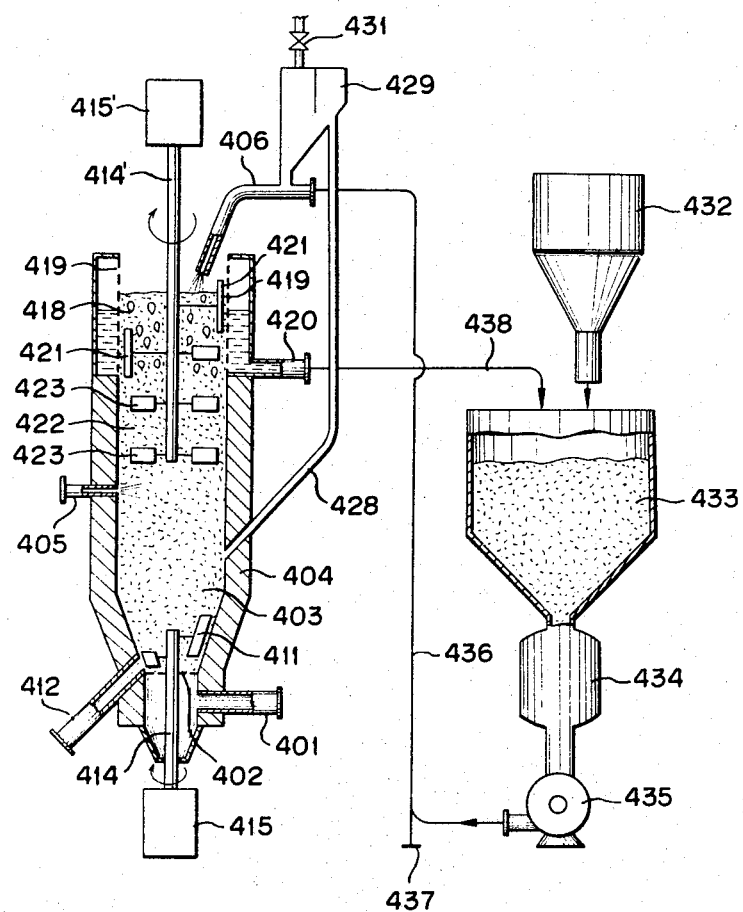

FIGURE 4 shows an example wherein the flooding technique is combined with the method of the present invention to be applied to the treatment of garbage. The reference numerals appearing in this figure whose last two digits are the same as the last two digits of the reference numerals in FIGURES 1 and 3 identify corresponding parts. In the drawing, garbage is first deprived of incombustible coarse masses, and then is passed through a sump 432 and a reservoir 433 and then is pulverized by wet pulverizer 434, therefrom the pulverized garbage is transferred together with water through a conduit 436 by virtue of the slurry pump 435, and via a supply pipe 406, into the incinerating apparatus. Numeral 437 represents a cleaner opening. Solid particles contained in the fluidized bed 403 are passed through a conduit 428 and a powder separator 429 and then into the slurry so as to be circulated. The water which was retained by the flooding action in the bed of bubbles located in the upper portion of the apparatus passes through the screen face 419 and is separated. This separated water passes through the water draining outlet 420 and through a conduit 438 and mostly returns to the reservoir 433 so as to be recycled. Flood-dehydration and incineration are performed in the same manner as is conducted in the apparatus of FIGURE 3. In this example, however, there is provided no inner cylinder within the apparatus. Incineration is conducted by maintaining a stable and steady flooding action by the control of the rate of mechanical stirring and the rate of air supply.

DESCRIPTION OF PREFERRED EMBODIMENTS

*Example 1.—Incineration of fowl excretions*

Fowl excretions usually contain about 80 percent of water and also pieces of shells, small pebbles and sand grains. It is generally quite difficult to incinerate them smoothly when they are in such state. The excretions are incinerated in the apparatus of the type shown in FIGURE 1. The apparatus comprises a cylinder made of mild steel, with the inner peripheral wall face being lined with refractory cement. The inner diameter of the cylinder is 340 mm., and the height is 600 mm. In the bottom portion is disposed an air-distribution plate which is comprised of a perforated plate having an appropriate ratio of opening (in this instance, the ratio is about one percent). Through this perforated plate, air is passed at the rate of 30 to 50 Nm.$^3$/hr. so that the sand grains are fluidized to the level which is about the middle of the height of the apparatus. The velocity of starting fluidization (minimum fluidization velocity) ($U_{mf}$) of the sand grains used is 14.3 cm./sec. at 28° C., and this velocity decreases with the increase in the temperature $t_B$ of the fluidized bed. This relation is shown hereunder when calculated in terms of normal temperature.

| $t_B$, °C | 28 | 100 | 200 | 300 | 400 | 500 | 600 |
|---|---|---|---|---|---|---|---|
| Air supply rate (percent) as against that when fluidization was started (normal temp.) | 100 | 72 | 52 | 41 | 33 | 27 | 23 |

Into a bed of sand grains already fluidized by air at normal temperature was fed hot combustion gas of L.P.G. directly from the side of the bed to heat the entire apparatus. After a predetermined temperature was reached, fowl excretions containing 70 to 85 percent of water were continuously introduced from the upper portion of the apparatus for being incinerated. Checked temperature of the fluidized bed was: $t_B$=370–850° C. Fowl excretions are fed at the average rate of 40 kg./hr. L.P.G. was supplied at the rate of 0.35–0.7 Nm.³/hr. The excess air rate was 20 to 40 percent.

Stirring vanes were disposed immediately above the upper face alone of the perforated plate, and were 40 mm. wide, 320 mm. long and 2 mm. thick, and were angled at 45° in the direction in which the particles were taken up and hurled. In this instance, the omission of the grate 110 and the stirring vanes 111' in FIGURE 1 caused no disorder of operation. The motor used in this example was of the capacity of 5 to 28 r.p.m. on 75 watts. However, only several watts or less were sufficient for running the main shaft of the apparatus. When the apparatus was operated by suspending the stirring, sintered blocks of sand grains containing small pebbles and pieces of shells were always noted. These sintered foreign materials grew into a mass of two to five cm. in thickness and accumulated on the upper face of the perforated plate in several hours after the operation was started. It required a considerable amount of labor to dismantle the apparatus and to remove the mass from the perforated plate. When the stirrer was rotated even at a low speed, the materials did not become sintered on the surfaces of the sand grains into larger masses, provided that the vanes were running. Operation was conducted intermittently for over two months without replacing or substituting the sand. Thereafter, the sand was drained and screened. It was found that there were sintered sand particles of about several millimeters in size mingled with small pebbles and pieces of shells. These were measured to be only 0.5 percent of the total volume of the sand. These small masses were considered to be produced when the sand grains were exposed directly to the flame and heat from the L.P.G. burner. The formation of these masses are considered to be reduced further by improving the nozzle portion of the burner. Masses of the aforesaid size were, however, fluidized well together with sand grains and did not settle on the plate and, therefore, they practically did not interfere with normal operation. Most of the ashes were carried outside the fluidized bed with the combusted gas and were collected by the cyclone-separator. Hardly any ashes were noted to remain in the apparatus. In case the temperature of the combusted gas was 700° C. or above, no odor was sensed.

Because air was supplied at normal temperature from the bottom of the apparatus, the temperature of the perforated plate 102, the stirring vanes 111 and the stirrer shaft 114 was considerably lower than that of the combustion zone 103. Ordinary mild steel materials with which the perforated plate and the stirrer are constructed stood the use of over several consecutive months, and still they were suitable for further use. The inner wall faces of the apparatus containing the fluidized bed, the surfaces of the perforated plate and the vanes were clean and no disorder was noted. Only the wall faces in the upper portion and those portions other than the fluidized bed were slightly covered with soot and ashes.

*Example 2.—Incineration of garbage and miscellaneous rubbish*

The same apparatus used in Example 1 was used. Under the same conditions except for temperature being 700 to 800° C., an incineration test of garbage and other rubbish was conducted. The result was substantially the same as that of the fowl excretions. In spite of the apparatus being of a smaller type, a rapid incineration was achieved. Garbage of vegetables and other garbage containing 70 percent or more of water, rinds, and cores of apples, entrails of fish and squids, rotten straw, drainage mud, sawdust containing 85 percent of water, bean curds, sludge of flour containing 75 percent or more of water could be incinerated within several minutes per kilogram of the waste materials. When these materials containing such a large amount of water were introduced into the apparatus, the temperature of the fluidized bed dropped for a moment by nearly 15° C. at the most, but it returned to its running temperature the next moment. For example, upon being introduced into the apparatus, waste of tea leaves was instantaneously deprived of the water with hissing sound and came up to the surface of the bed and was immediately carbonized and combusted. Bean curds first sank into the bed and became invisible for one second, but they were quickly dried up and pulverized and some of them were seen coming up to the surface of the bed. In case the temperature of the fluidized bed was relatively low under 500° C., carbonized light masses of bean curds were observed to rise to the surface of the bed while combusting.

*Example 3.—Dehydration and incineration of wood meal suspended in water*

An apparatus as shown in FIGURE 3, namely, having a structure that the combustion section had an inner diameter of 220 mm. and overall height of 1060 mm., the drying section having an inner cylinder made of stainless steel having the top diameter of 100 mm., a height of 195 mm. and having the bottom diameter of 90 mm. and having more than 10 holes of 3 mm. in diameter formed on the side wall, said apparatus being further provided at the upper flood-dehydration section with a perforated plate (the diameter of the opening being 3 mm.) which was 260 mm. in diameter and 180 mm. in height and lined with a metal wire screen of 200 mesh as a filter was used to conduct a continuous incineration of wood meal containing 90 to 95 percent of water which was provided in the form of a suspension in water. The stirrer driving motor was 75 watts and 28 r.p.m. in capacity which was reduced in speed to one-sixth in driving the shaft of the stirrer. The filtering face of the screen was refreshed by the vanes fixed to the rotation shaft which was inserted into the apparatus from the top thereof. Said vanes were of the dual type designed to take up particles and hurl them upward and at the same time to forward other particles downward. Air was supplied at the rate of 28 Nm.³/hr. without preheating and without the provision of heating burner for the fluidized bed. The combustion temperature was 600° C. ± 20° C. The fluidized bed was stirred at the rate of 20 r.p.m. The combustion velocity was 4 to 6 kg./hr. in dry form, and this was a value approximately close to the theoretical rate. The flood-dehydration section in the upper part of the apparatus was held in suspension state. Water was drained through the screen of said section at the rate of 40 to 45 kg./hr. The combustion gas was cooled thereat to almost normal temperature, and the gas was deprived of dust before it was exhausted outside from the top of the apparatus. A very small amount of ashes was discharged from the combustion section. In this instance, the apparatus was of a smaller size and involved a relatively large thermal loss. It was, therefore, impossible to use this apparatus as a boiler to produce steam continuously. The total volume of sand grains including those recycled was 7 to 10 kg.

After various tests were conducted, the apparatus was dismantled and the interior was examined. It was found that the stirring shafts inserted from top and bottom of the apparatus and the perforated plate located in the bottom portion of the apparatus which were made of ordinary mild steel were strong enough to stand the continuous use of several months. They were found to be still usable continuously in the future. The inner cylinder disposed in the drying section was cooled because it was contacted by the bed of wet particles, and therefore, an inner cylinder made of ordinary stainless steel will sufficiently stand the use. There was noted no ashes and sand grains fused and adhered to the inner surfaces of the apparatus. As was so with the other examples, the inner surface walls of the portion of the apparatus which were in contact with the fluidized bed and the surfaces of the perforated plate located in the bottom portion of the apparatus and the periphery of the shafts were found to be quite clean.

As has been described, according to the method of the present invention, various combustible waste materials such as garbage, rubbish, sludge or the like which contain a large amount of water and which is in moist state can be easily incinerated by the use of an apparatus having a simple structure. Combustible waste materials include, in addition to those listed above, those which are in solid state at normal temperature but which will melt, will vaporize or will become half melted at a low temperature below the combustion temperature. Waste materials which are in moist form in a liquid other than water can also be treated. Various waste liquids discharged from factories which have become a serious problem in such factories can be easily treated by the incineration method of the present invention with or without preliminary condensing the liquid, although there may be an instance where an auxiliary fuel is needed from the viewpoint of thermal balancing.

The embodiments of the invention in which an exclusive property or privilege is claimed are defined as follows:

1. A method for incinerating moist combustible materials utilizing an incinerating apparatus containing a fluidized bed, said bed consisting of solid particles having a melting point higher than the temperature at which said material can be incinerated, a gas distributor plate disposed at the bottom of said bed and a stirrer disposed above said gas distributor plate and mounted on a shaft which extends downwardly therethrough, said method comprising;
   introducing an upwardly flowing stream of fluidizing and combustion gas at a relatively low temperature into said fluidized bed through said gas distributor plate and thereby maintaining said particles in a fluidized state;
   continuously gently stirring the bottom portion of the bed to prevent blocking of the gas distributor plate and to break up and circulate within the bed the solid components of the combustible materials;
   feeding moist combustible material into said apparatus so that it contacts said bed;
   maintaining said bed at a temperature required for the combustion of the material by injecting a stream of heat-supplying material into said bed at a position between the upper and lower surfaces of said bed, the heat supplying material being injected into the bed as needed to maintain said bed at said temperature and constituting the sole outside source of substantial heat for said bed, whereby the gas distributor plate and the parts therebelow are protected from exposure to high temperature; and
   withdrawing the residual ash from the apparatus.

2. A method for incinerating combustible moist material according to claim 1, wherein:
   the rate of gas supply to said fluidized bed is held in the range of from about 3 to about 15 times the minimum fluidizing velocity of said solid particles.

3. A method for incinerating combustible moist material according to claim 1, wherein:
   said solid particles used in said fluidized bed have a mean diameter of from about 50 microns to about 60 millimeters.

4. A method for incinerating combustible moist material according to claim 1, wherein:
   said stirring of the bottom portion of said fluidized bed is effected by vanes fixed to a rotary shaft disposed and extending vertically and centrally of said fluidized bed, said vanes being rotated at a speed not exceeding 30 r.p.m.

5. A method for incinerating moist combustible materials according to claim 1, including the step of
   withdrawing residual ash from said fluidized bed mixed with said fluidizing solid particles through exit means.

6. A method for incinerating moist combustible materials according to claim 1, in which the feeding step includes
   dumping large size masses of combustible materials directly into said fluidized bed without any size-reducing pre-treatment.

7. A method for incinerating moist combustible materials according to claim 1, in which the feeding step includes
   supplying moist combustible materials in the form of suspensions in liquids and feeding same into said fluidized bed.

8. A method for incinerating moist combustible materials according to claim 1, wherein:
   said fluidized bed has a bulk density heavier than the density of the moist combustible materials to be incinerated.

9. A method for incinerating moist combustible materials according to claim 1, including the step of
   recovering useful heat from the flue gas exhausted from said fluidized bed.

10. A method for incinerating moist combustible materials according to claim 1, including the step of
    withdrawing a part of said solid particles from said fluidized bed and recycling same into said bed.

11. A method for incinerating moist combustible materials according to claim 1, wherein said apparatus comprises a drying section above and communicating with said incinerating bed, and including the steps of feeding said moist combustible materials to the drying section before the combustible materials contact said fluidized bed, said drying section consisting of a bed of fluidized solid particles,
    stirring the solid particles located in the lower portion of the drying section so as to force them upwardly while stirring said solid particles located in the upper portion of said drying section so as to force them downwardly, the net effect of the stirring being to force said solid particles downwardly,
    supplying an upwardly flowing gas stream to the drying section at a sufficiently high rate relative to the downward flow of the solid particles to prevent downflow of liquid in the drying section; and
    separatng liquid from said combustible materials containing a large amount of liquid above said drying section by filtering.

12. A method for incinerating combustible moist material according to claim 11, wherein said solid particles in said drying section are stirred by vanes fixed to a rotary shaft disposed and extending vertically and centrally of said drying bed, said vanes being rotated at a speed not exceeding 15 r.p.m.

13. A method for incinerating combustible moist material according to claim 11, wherein the rate of gas supplied to said drying section is held in the range of from about one-half to about five times the minimum fluidizing velocity of said solid particles.

14. An apparatus for incinerating moist combustible materials comprising:
- a casing;
- a fluidized bed disposed within said casing and consisting of solid particles having a melting point higher than the temperature at which said material can be incinerated;
- a gas distributor plate disposed within said casing at the bottom of said bed;
- stirring means vertically and centrally disposed above said gas-distributor plate within said casing and adapted to stir the area immediately above said plate and covering substantially the entire lower region of said fluidized bed;
- a first inlet for feeding said moist combustible material into the casing and a first outlet for exhausting spent combustion gas from the casing, both said first inlet and said first outlet being disposed above said fluidized bed;
- a second inlet for feeding solid particles into said fluidized bed;
- a second outlet disposed below said fluidized bed for removing relatively large size solid particles from said casing;
- a third inlet for supplying a fluidizing and combustion gas at a low temperature to the casing below said gas distribution plate;
- a fourth inlet for introducing a stream of heat supplying material directly into said fluidized bed at a position between the top of said bed and said gas-distributor plate, said fourth inlet being connected to a source of heat supplying material separate from the source of gas connected to said third inlet.

15. An apparatus for incinerating moist combustible materials according to claim 14, wherein:
said gas-distributor plate is made of steel and said stirring means is made of steel, said stirring means including a shaft extending vertically and centrally through said gas-distributor plate from underneath at the lowest part of said fludizied bed, both said gas distributor plate and said stirring means being free of connection to any external cooling means.

16. An apparatus for incinerating moist combustible materials according to claim 14, including
a further outlet and a further inlet for withdrawing and recycling a portion of the solid particles from and into said fluidized bed, respectively.

17. An apparatus for incinerating moist combustible materials according to claim 14, including
- a drying bed consisting of solid particles located above said fluidized bed and communicating therewith;
- second stirring means for stirring said solid particles of said drying bed;
- said second stirring means comprising a rotary shaft extending vertically and centrally of said drying bed and vanes located in the lower portion of said drying bed and being adapted to be take up solid particles and move then upwardly and the other vanes located in the upper portion of said drying bed and being adapted to force the solid particles downwardly, said second stirring means being effective to move the solid particles of said drying bed downwardly as a whole; an outlet for by-passing the combustion gas; and
- liquid separating means located above said drying bed.

18. An apparatus for incinerating combustible moist material according to claim 17, wherein:
said liquid separating means comprises a filter medium disposed along the extension of the lateral periphery of said drying bed and being located above said drying bed.

19. An apparatus for incinerating combustible moist material according to claim 17, wherein:
there is provided an inner cylinder surrounding said drying bed and having a downwardly narrowing circumference and having, on the periphery of said cylinder, a plurality of holes for passing combustion gas into said drying bed.

References Cited

UNITED STATES PATENTS

| 3,298,792 | 1/1967 | Drusco. | |
| 3,306,236 | 2/1967 | Campbell | 110—8 |
| 3,319,586 | 5/1967 | Albertson et al. | 110—8 |

FOREIGN PATENTS

| 194,331 | 1/1958 | Austria. |

JAMES W. WESTHAVER, *Primary Examiner.*